United States Patent
Ghanekar et al.

(10) Patent No.: US 9,767,198 B2
(45) Date of Patent: Sep. 19, 2017

(54) METHOD AND SYSTEM FOR PRESENTING CONTENT SUMMARY OF SEARCH RESULTS

(71) Applicant: Yahoo! Inc., Sunnyvale, CA (US)

(72) Inventors: Amol Ghanekar, Sunnyvale, CA (US); Bharadhwaj Narayanan, Sunnyvale, CA (US); John Peng, Burbank, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 290 days.

(21) Appl. No.: 14/468,049

(22) Filed: Aug. 25, 2014

(65) Prior Publication Data
US 2016/0055259 A1 Feb. 25, 2016

(51) Int. Cl.
*G06F 17/30* (2006.01)

(52) U.S. Cl.
CPC .. *G06F 17/30864* (2013.01); *G06F 17/30719* (2013.01)

(58) Field of Classification Search
CPC ......... G06F 17/30864; G06F 17/30719; G06F 17/30; G06F 17/30554; G06F 17/30132; G06F 17/3033; G06F 17/30867; G06F 17/30905; G06F 17/30861; G06F 17/3064; G06F 3/0482; G09B 7/02; G06Q 10/00
See application file for complete search history.

(56) References Cited

U.S. PATENT DOCUMENTS

| | | | | |
|---|---|---|---|---|
| 5,845,278 A | * | 12/1998 | Kirsch | G06F 17/3061 707/688 |
| 7,181,435 B2 | * | 2/2007 | Cambot | G06F 17/30398 707/E17.014 |
| 8,843,465 B2 | * | 9/2014 | Hylton | G06Q 30/02 707/706 |
| 2007/0208704 A1 | * | 9/2007 | Ives | G06F 17/30905 707/E17.121 |
| 2008/0072210 A1 | * | 3/2008 | Rush | G06F 8/33 717/121 |
| 2008/0133482 A1 | * | 6/2008 | Anick | G06F 17/30696 707/E17.108 |
| 2008/0313147 A1 | * | 12/2008 | Svore | G06F 17/30657 707/E17.014 |

(Continued)

OTHER PUBLICATIONS

Ziad Al Bawab et al.—"Finding Trending Local Topics in Search Queries for Personalization of a Recommendation System"—Proceeding KDD '12 Proceedings of the 18th ACM SIGKDD international conference on Knowledge discovery and data mining pp. 397-405—Beijing, China—Aug. 12-16, 2012.*

(Continued)

*Primary Examiner* — Anh Ly
(74) *Attorney, Agent, or Firm* — Pillsbury Winthrop Shaw Pittman LLP

(57) ABSTRACT

Methods, systems and programming for presenting content summary of search results. In one example, an input associated with a search query is received from a user. One or more search results are fetched based on the search query. A summary of content with respect to at least one of the one or more search results is obtained. A search result page is presented to the user as a response to the input. The search results page includes the one or more search results and at least part of the summary of content.

15 Claims, 17 Drawing Sheets

(56) References Cited

U.S. PATENT DOCUMENTS

| | | | | |
|---|---|---|---|---|
| 2013/0124496 A1* | 5/2013 | Edgar | ............... | G06F 17/30876 |
| | | | | 707/708 |
| 2014/0067816 A1* | 3/2014 | Kanungo | ............. | G06F 17/274 |
| | | | | 707/740 |
| 2014/0129625 A1* | 5/2014 | Haugen | .................. | H04W 4/08 |
| | | | | 709/204 |
| 2014/0280017 A1* | 9/2014 | Indarapu | ................ | G06Q 50/01 |
| | | | | 707/711 |
| 2014/0365452 A1* | 12/2014 | Ma | .................... | G06F 17/30864 |
| | | | | 707/706 |
| 2015/0106201 A1* | 4/2015 | Agarwal | ............ | G06Q 30/0256 |
| | | | | 705/14.54 |
| 2015/0142566 A1* | 5/2015 | Zhang | ................ | G06Q 30/0256 |
| | | | | 705/14.54 |
| 2015/0227517 A1* | 8/2015 | Lymberopoulos | | G06F 17/30132 |
| | | | | 707/706 |

OTHER PUBLICATIONS

Jiang Bian et al.—"User Action Interpretation for Online Content Optimization"—IEEE Transactions on Knowledge and Data Engineering, vol. 25, No. 9, Sep. 2013—pp. 2161-2174.*

* cited by examiner

METHOD AND SYSTEM FOR PRESENTING CONTENT SUMMARY OF SEARCH RESULTS

BACKGROUND

Technical Field

The present teaching relates to methods, systems, and programming for online search. Particularly, the present teaching relates to methods, systems, and programming for presenting search results to users.

Discussion of Technical Background

Online content search is a process of interactively searching for and retrieving requested information via a search application running on a local user device, such as a computer or a mobile device, from online databases. Online search is conducted through search engines, which are programs running at a remote server and searching webpages or documents for specified keywords and return a search results page having a list of links to the webpages or documents where the keywords are found.

The known search result pages provide a list of links to websites or documents—each with a one-sentence snippet from the webpages, which are incomplete and sometimes redundant. FIG. 1 illustrates an exemplary prior art search results page 100 with snippets 102, 104, 106 presented with each link to a website or document (search results) in response to the search query "Google breakup." In this prior art example, each snippet is merely a predefined certain segment (usually the first sentence or part of the first sentence) of the corresponding webpage or document. Snippets, however, most often cannot well serve the purpose of providing sufficient context or insight of the webpage or document so as to help users to quickly determine the relevance of each search result without further clicking on the search result.

Therefore, there is a need to provide an improved solution for presenting search results to users to solve the above-mentioned problems.

SUMMARY

The present teaching relates to methods, systems, and programming for online search. Particularly, the present teaching relates to methods, systems, and programming for presenting search results to users.

In one example, a method, implemented on at least one machine each having at least one processor, storage, and a communication platform connected to a network for presenting content summary of search results is provided. An input associated with a search query is received from a user. One or more search results are fetched based on the search query. A summary of content with respect to at least one of the one or more search results is obtained. A search result page is presented to the user as a response to the input. The search results page includes the one or more search results and at least part of the summary of content.

In a different example, a system having at least one processor, storage, and a communication platform connected to a network for presenting content summary of search results is provided. The system includes a user interfacing module, a search results fetching module, a summary fetching module, and a search results page generating module. The user interfacing module is configured to receive an input associated with a search query from a user. A search results fetching module is configured to fetch one or more search results based on the search query. A summary fetching module is configured to obtain a summary of content with respect to at least one of the one or more search results. A search results page generating module is configured to present a search result page to the user as a response to the input. The search results page includes the one or more search results and at least part of the summary of content.

Other concepts relate to software for presenting content summary of search results. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for presenting content summary of search results is provided. An input associated with a search query is received from a user. One or more search results are fetched based on the search query. A summary of content with respect to at least one of the one or more search results is obtained. A search result page is presented to the user as a response to the input. The search results page includes the one or more search results and at least part of the summary of content.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
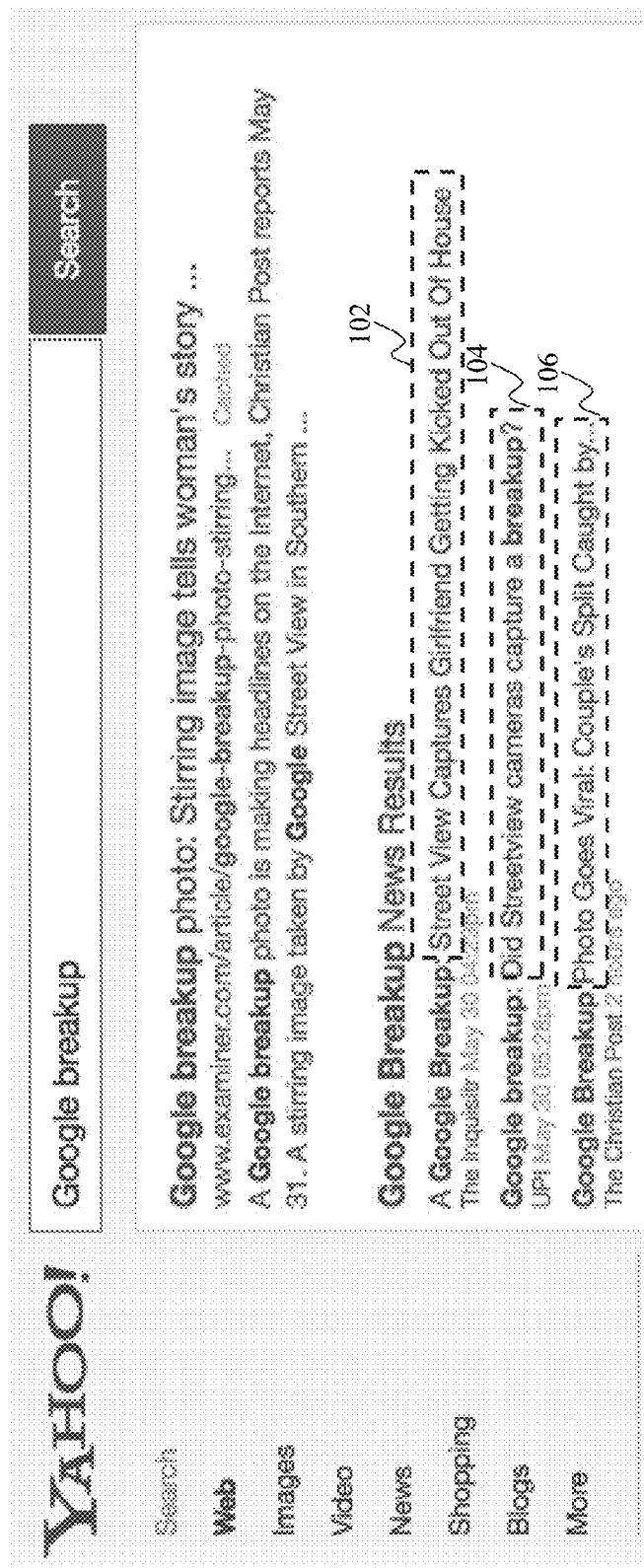
FIG. 1 depicts an exemplary prior art search results page.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching describes methods, systems, and programming aspects of presenting a content summary of search results to users. The methods and systems in the present teaching improve users' search experience by providing smaller complete stories, i.e., summaries, as opposed to multiple story abstracts, which show part of, or redundant snippets of the same story. The summary of the search result(s) provides a user the information that she/he is interested in such that the user does not have to perform any more clicks to reach to the information she/he is interested in. The methods and systems in the present teaching improve user experience by saving the user's time, as the complete story relating to the query is surfaced on the search results page itself. The user can still click on the webpage or other results on the page if the user is interesting, or needs in-depth information on the topic. Accordingly, the methods and systems in the present teaching solve the common problem called "tldr" (too long dint read) in the context of search results.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 2:
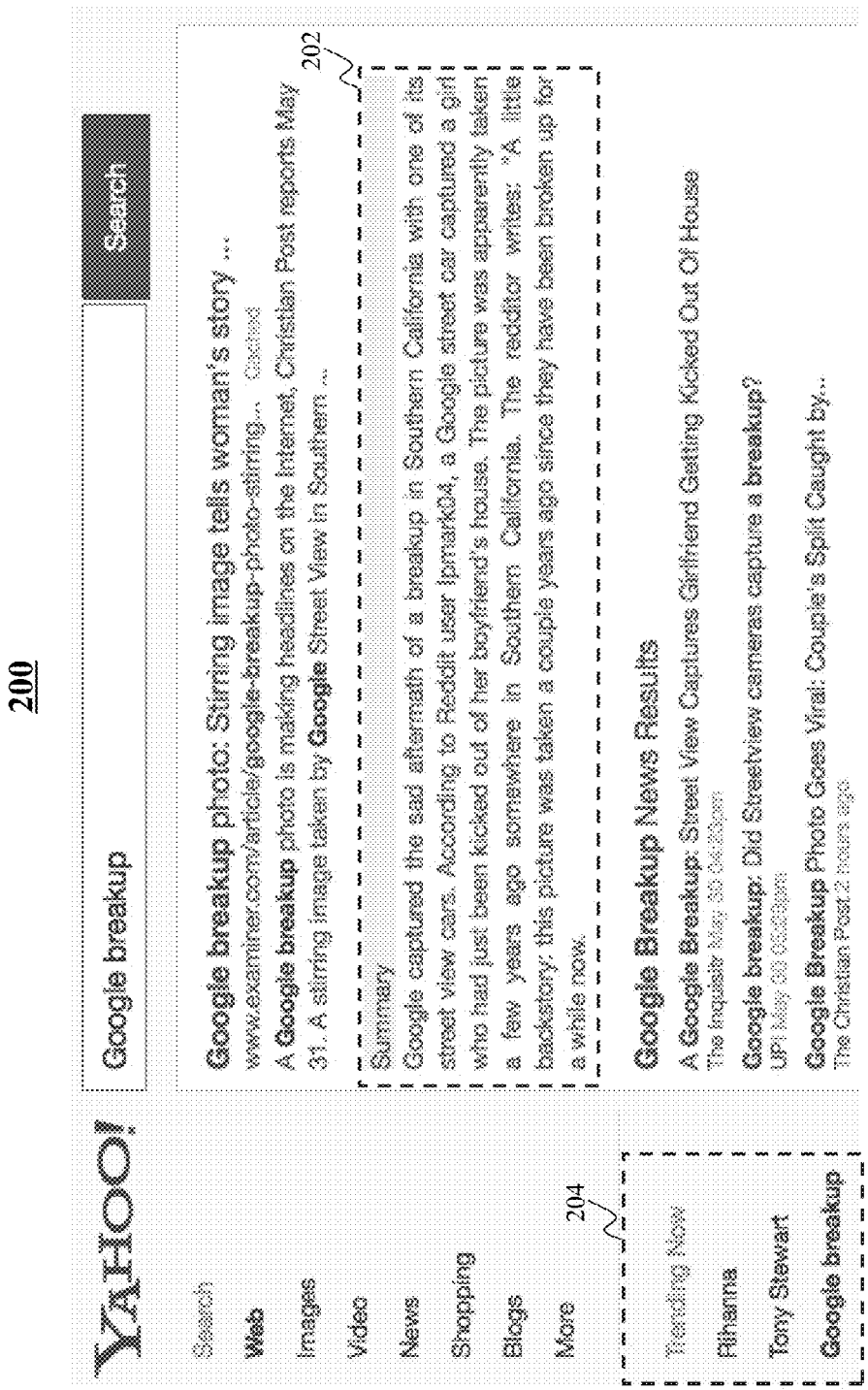
FIG. 2 depicts an exemplary search results page having a content summary of search results, according to an embodiment of the present teaching.

FIG. 2 depicts an exemplary search results page having a content summary of search results, according to an embodiment of the present teaching. In addition to the search results links and snippets, which are also in the prior art example of FIG. 1, the search results page 200 in this example further includes a content summary 202 of the search results. The content summary 202 may be generated using any suitable automatic summarization technology, which is a process of reducing a text document with a computer program in order to create a summary that retains the important points of the original document. Methods of automatic summarization include, for example, extraction-based, abstraction-based, maximum entropy-based, and aided summarization. In this example, the content summary 202 summarizes the content of the top three search results of the search query "Google breakup," which gives the user a whole picture of the story that the user might be interested in. The content summary 202 in this example is presented in a separate section with a header "Summary" on the search results page 200. In other examples, a content summary may be generated based on a single search result, e.g., a webpage or a document, and multiple content summaries may be presented near each respective search result link. In this example, the search results page 200 further includes a "Trending Now" section 204, which provides several most popular search queries in the general user population so that a user can select one of the trending queries without typing it into the search box. As described in detail below, to reduce response time, for each of the trending queries, its search results and content summary thereof may be generated offline in advance and retrieved instantaneously at runtime once a user selects it.

Figure 3:
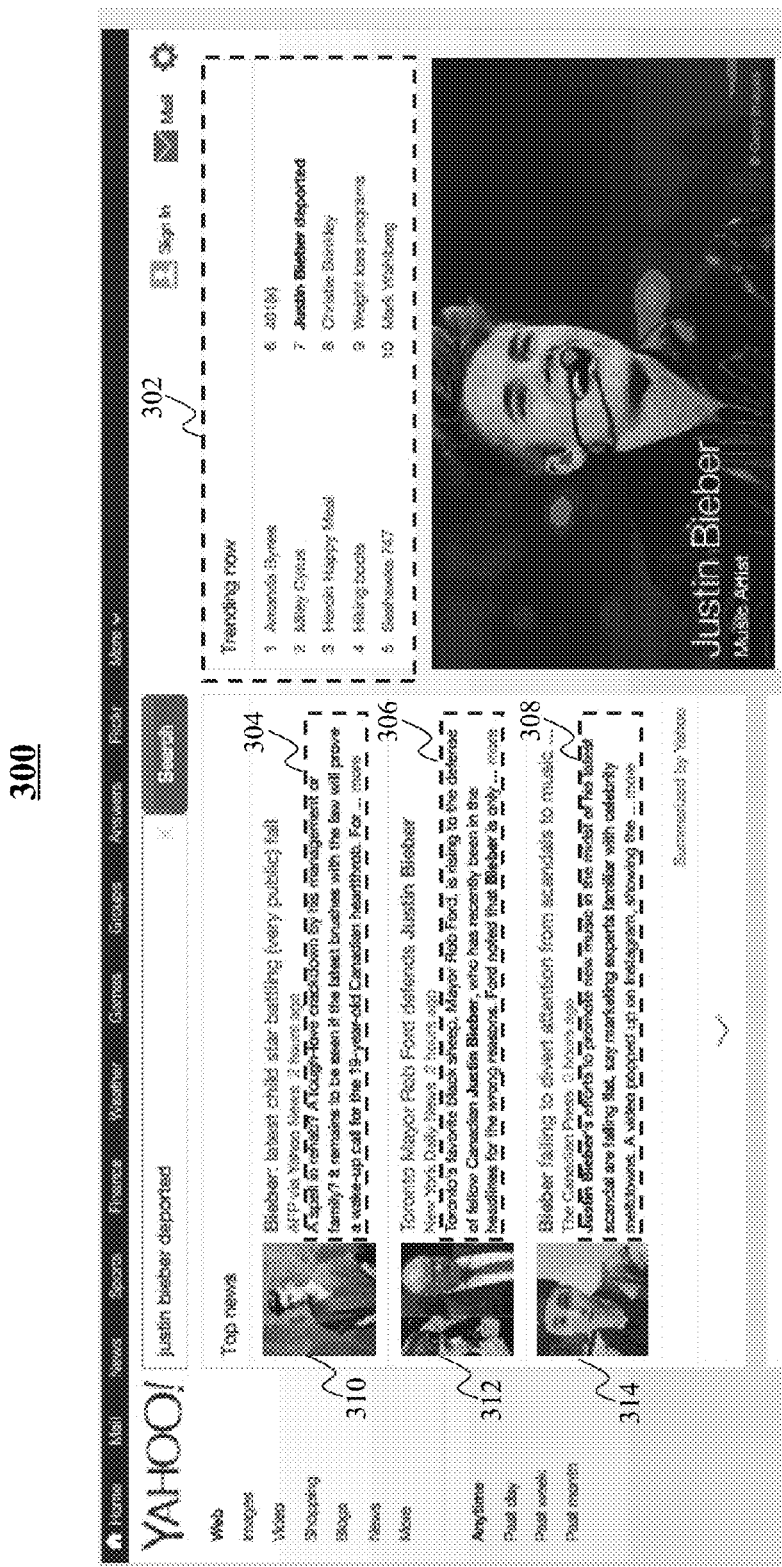
FIGS. 3-4 depict an exemplary search results page having multiple content summaries of search results, according to an embodiment of the present teaching.
Figure 4:
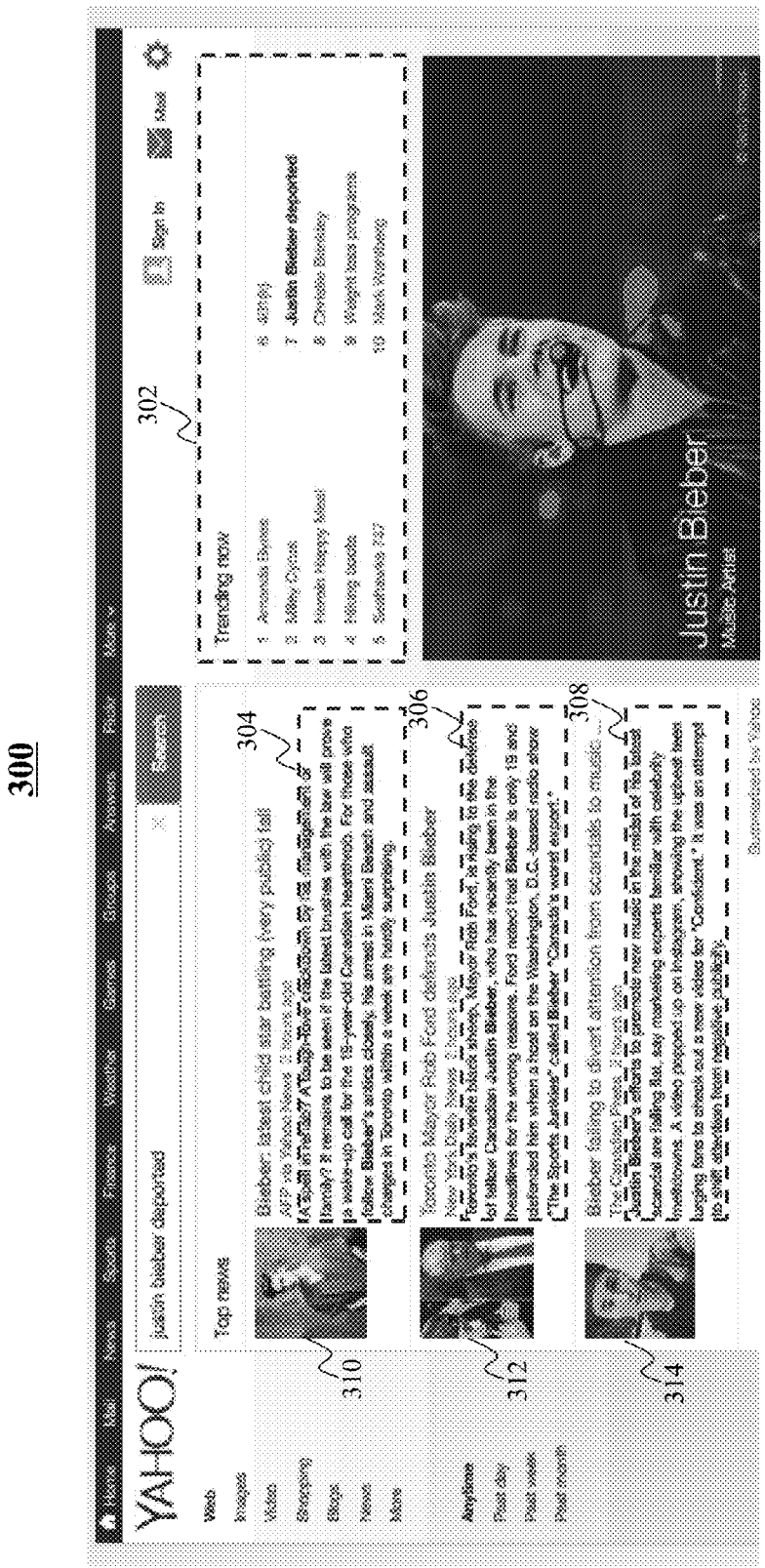

FIGS. 3-4 depict an exemplary search results page having multiple content summaries of search results, according to an embodiment of the present teaching. The search results page 300 in this example includes the "Trending Now" section 302 having 10 trending queries for a user to select. In this example, "Justin Bieber deported" is selected, and three top search results are presented as "Top news" on the search results page 300. For each of the three top search results (top news), a respective content summary 304, 306, 308 is presented below the search result link. Each of the content summaries 304, 306, 308 is made based on the corresponding news using any suitable automatic summarization technology. Rather than providing a single, combined content summary, e.g., the content summary 202 in FIG. 2, which gives the user a whole picture of the story behind the search query, the content summaries 304, 306, 308 in this example aim at providing the insight of each specific search result, which may be helpful for the user in determining the relevance of each search result without clicking on the link. In this example, pictures 310, 312, 314, or any other non-textual content extracted from the respective search result webpage or document, may be presented with the search result links and content summaries 304, 306, 308.

The geometric parameter (e.g., size) or number of words for each content summary may be limited in the content summary's initial presentation. For example, only part of a content summary 304, 306, 308 is provided in FIG. 3, which is limited by the number of words. A "more" button/link is provided at the lower-right corner of the partial content summary for triggering the display of the entire content summary. As shown in FIG. 4, once the "more" button/link is clicked, the entire content summaries 304, 306, 308 are presented. It is also understood that, the user is free not to select any trending queries and instead, to type in any search query through the search box. Depending on whether the related search results have been summarized before or not, a corresponding content summary may be retrieved from a database or generated on the fly. It is also understood that in case a content summary is unavailable, for example, when the search results are those types that are not suitable for content summary (e.g., pictures or videos) or when the real-time summarization is too time consuming, a conventional search results page may be presented to avoid bad user experience.

Figure 5:
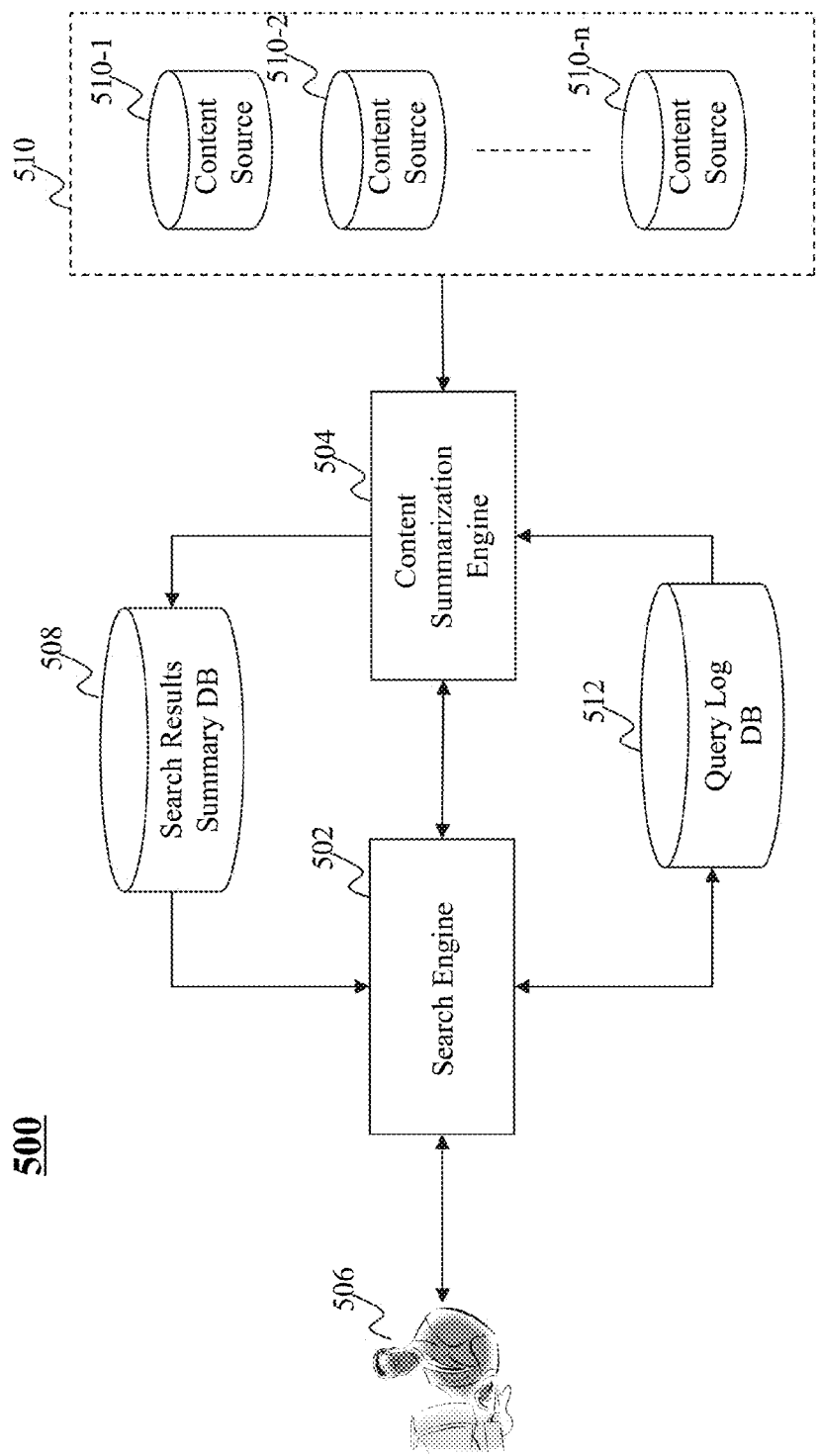
FIG. 5 is an exemplary system diagram of a system for presenting a content summary of search results, according to an embodiment of the present teaching.

FIG. 5 is an exemplary system diagram of a system for presenting a content summary of search results, according to an embodiment of the present teaching. The system 500 in this embodiment includes a search engine 502 and a content summarization engine 504. The search engine 502 receives search queries from a user 506, either by direct typing keywords in the search box or by selecting one of the query suggestions or trending queries. The search engine 502 further fetches search results of the received search queries and decides whether one or more content summaries are available in a search results summary database 508 for any of the search results. The content summarization engine 504 in this example may generate content summaries for search results offline and store them into the search results summary database 508 so that the search engine 502 can retrieve the suitable content summary from the search results summary database 508 at runtime when the corresponding search query (e.g., one of the trending queries) or search result(s) are received.

In this embodiment, in case the content summary has not been generated and stored before in the search results summary database 508, optionally, the content summarization engine 504 may perform automatic content summarization based on one or more search results in real-time. The content summarization engine 504 may fetch the content of the search result(s) from content sources 510-1, 510-2, . . . , 510-n and perform automatic content summarization using any suitable approaches. One example is disclosed in the PCT Patent Application Publication No. WO2013066497, entitled "METHOD AND APPARATUS FOR AUTOMATICALLY SUMMARIZING THE CONTENTS OF ELECTRONIC DOCUMENTS," which is incorporated herein by reference. Any other known automatic summarization technology, such as extraction-based, abstraction-based, maximum entropy-based, and aided summarization, may be applied by the content summarization engine 504 as well for creating content summarization either offline or at runtime. In this example, a query log database 512 may be used by the search engine 502 and/or the content summarization engine 504 for determining search queries whose search results need to be summarized offline in advance, such as the trending queries.

It is understood that the search engine 502 in this embodiment is not limited to a traditional web search engine that crawls websites on the Internet, builds webpage index, and retrieves webpages based on received keywords. The search engine 502 may be any online system that provides output content/results in response to an input query. The search engine 502 may be an online knowledge-based information retrieving system that provides answers to questions from users. For example, a user may ask a question of "should I leave college to start a business" through the search engine 502, and several answers may be returned on a result page provided by the search engine 502. The answers may be provided automatically based on information in any content source or provided manually by other users. Nevertheless, the content summarization engine 504 may perform automatic content summarization with respect to any answers/results returned from the search engine 502, which are not limited to webpages or documents in the traditional web search engine environment.

Figure 6:
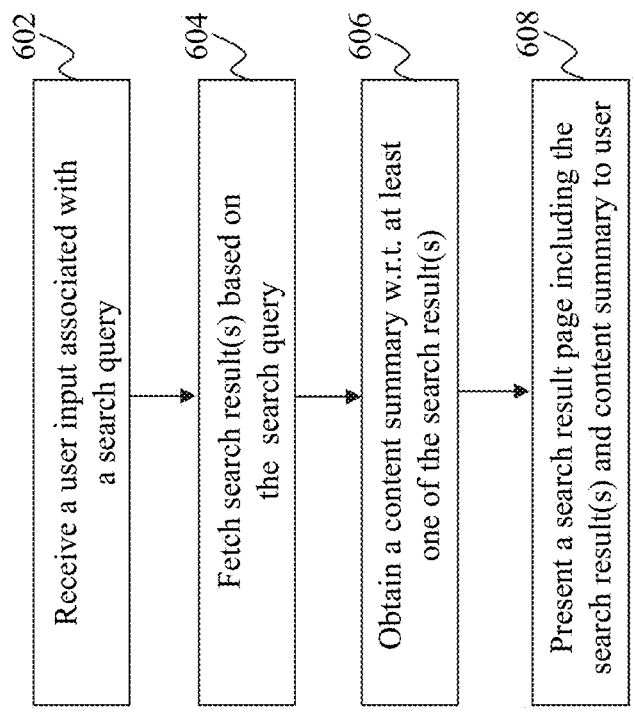
FIG. 6 is a flowchart of an exemplary process for presenting a content summary of search results, according to an embodiment of the present teaching.

FIG. 6 is a flowchart of an exemplary process for presenting a content summary of search results, according to an embodiment of the present teaching. Starting at 602, a user input associated with a search query is received. The input may be selection of the search query from multiple search queries presented to the user, e.g., trending queries or search suggestions, as well as any keywords directly typed in by the user. At 604, search result(s) are fetched based on the search query. The search result(s) may be of different types fetched from different verticals, such as news articles, sports, images, videos, local information, PDF, WORD or PPT documents, etc. The number of search result(s) fetched for each search query may be limited, e.g., the top three or 10 most relevant search results. At 606, a summary of content with respect to at least one of the search result(s) is obtained. In one example, for each of the search results, a content summary is obtained. In another example, a combined content summary for multiple search results is obtained. The content summary may be obtained by retrieving an existing content summary from the search results summary database 508 or generated by the content summarization engine 504 in real-time. Eventually, at 608, a search results page is presented to the user as a response to the user input. The search results page includes the search result(s) of the search query and at least part of the content summary. If only part of the content summary is initially presented to the user, for example, due to the word count limitation, the entirety of the content summary may be available for the user upon further user input. The search results and/or the content summary may be present on the search results page in various ways. In one example, as shown in FIG. 2, the content summary may be presented in a section separate from the search results links. In another example, as shown in FIGS. 3-4, each content summary may be presented next to the corresponding search result link. In still another example, a user action may trigger the display of a content summary. For example, once the user hovers over or clicks a separate button or any suitable user interface element on a particular search result in the list, the content summary of the particular search result may be exposed to the user.

Figure 7:
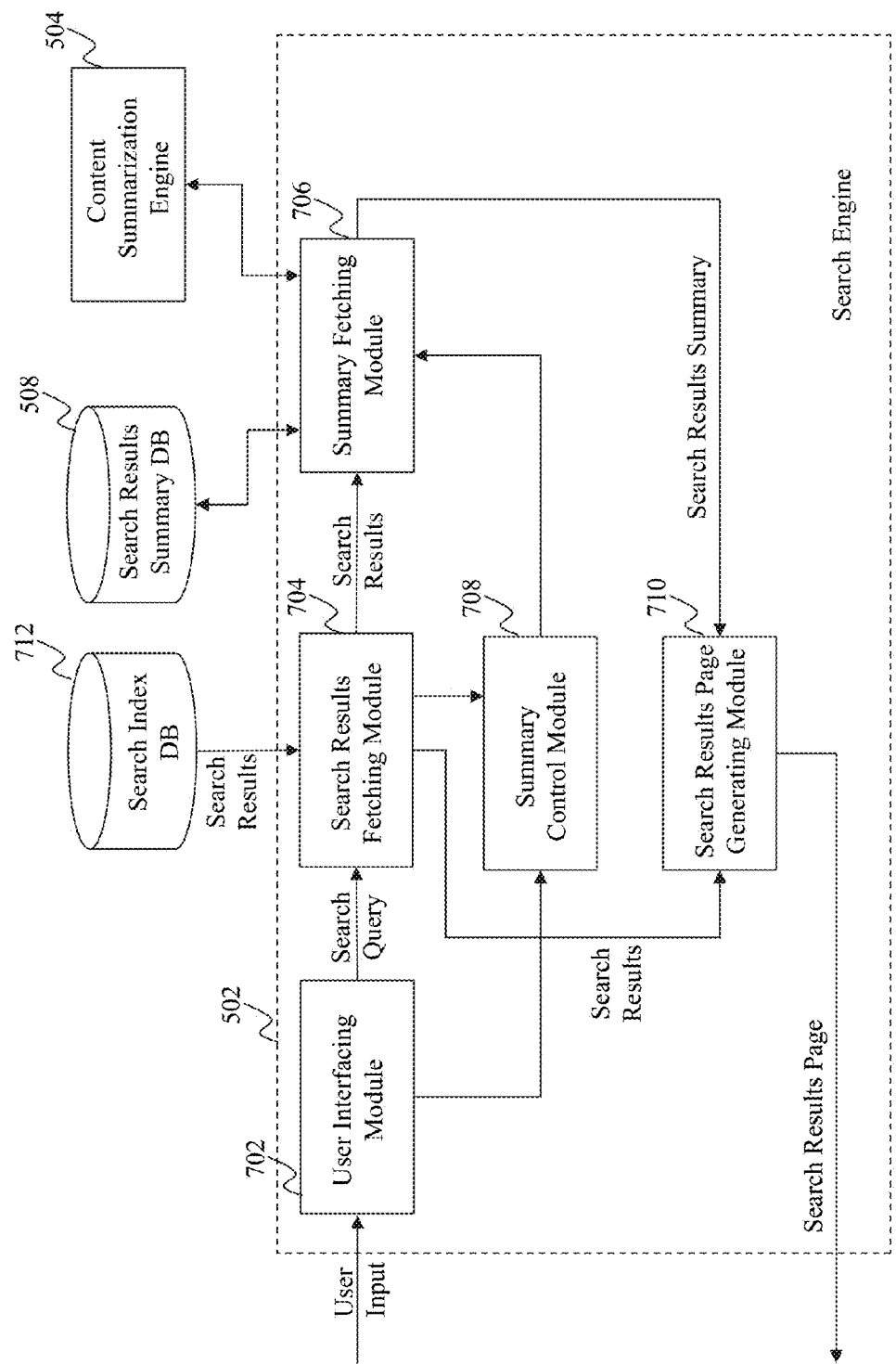
FIG. 7 is an exemplary system diagram of a search engine in the system of FIG. 5, according to an embodiment of the present teaching.

FIG. 7 is an exemplary system diagram of a search engine in the system of FIG. 5, according to an embodiment of the present teaching. The search engine 502 in this embodiment includes a user interfacing module 702, a search results fetching module 704, a summary fetching module 706, a summary control module 708, and a search results page generating module 710. The user interfacing module 702 is configured to receive user input associated with a search query and provide the search query to the search results fetching module 704. The search query may be keywords inputted through a search box or received as selection of a suggested trending query or search suggestion. The search results fetching module 704 is configured to fetch corresponding search results from a search index database 712. The types and number of search results fetched for a search query may be controlled by the user and/or the search engine 502. For example, the user may specify the vertical(s) from which the search results can be retrieved; the search engine 502 may set the number of search results fetched for a trending query.

Nevertheless, the fetched search result(s) are provided to the summary fetching module 706, which is configured to obtain one or more content summaries with respect to at least one or some of the search results. In one example, the summary fetching module 706 retrieves the content summary, which has been generated before by the content summarization engine 504, from the search results summary database 508. For example, for each of the trending queries, at least one content summary may be pre-generated and stored in the search results summary database 508 as it is very likely that such search query will be requested at a high frequency. Even a search query itself may not be a trending query with pre-generated content summary, a specific search result, e.g., a hot news article, may have been summarized before by the content summarization engine 504. Thus, for any subsequent search query that triggers fetching of the specific search result, the pre-generated content summary can be directly retrieved from the search results summary database 508. In other words, the offline pre-generation of content summary may be conducted at the query level, e.g., for each trending query, or at the search result level, e.g., for a popular search result.

In another example, if there is not any pre-generated content summary available in the search results summary database 508, the summary fetching module 706 in conjunction with the summary control module 708 may optionally send a request to the content summarization engine 504 to perform real-time content summarization based on the fetched search results and return the content summary. It is understood that in some examples, it may not be desirable to keep the user waiting while the content summarization engine 504 is performing the real-time content summarization. In this situation, the search engine 502 may decide not to present the content summary as a response at this time. Instead, the search engine 502 may treat the request as a trigger for the content summarization engine 504 to perform offline content summarization for the search query and/or any search results thereof so that next time when the same search query or search result(s) are received again, the summary fetching module 706 can directly retrieve the already generated content summary. To reduce the system load, in some examples, only when the number of the same request has reached a threshold, i.e., the query or search result has become popular in the general population, the content summarization engine 504 starts to the summarization process for the search result(s). All the decisions regarding the summary fetching and generation in this embodiment may be made by the summary control module 708, which is descried below in detail.

In this embodiment, the search results page generating module 710 is configured to generate and present a search results page to the user as a response to the user input. The search results page generating module 710 receives the fetched search result(s) from the search results fetching module 704 and the content summary of the search result(s) from the summary fetching module 706. As shown in the examples of FIGS. 2-4, the search results page may be generated with different layouts. The content summary may be shown in a separate section on the search results page (e.g., FIG. 2) or close to where the one or more corresponding search results locate on the search results page (e.g., FIGS. 3-4). As mentioned above, non-textual information, e.g., images, may be extracted from the search result(s) and presented next to the content summary.

Figure 8:
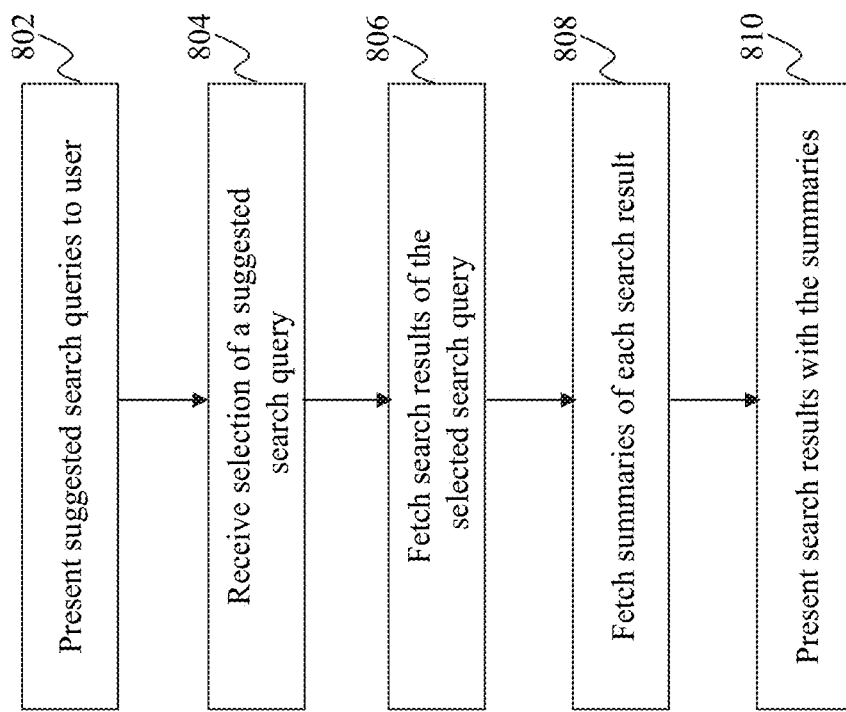
FIG. 8 is a flowchart of another exemplary process for presenting a content summary of search results, according to an embodiment of the present teaching.

FIG. 8 is a flowchart of another exemplary process for presenting a content summary of search results, according to an embodiment of the present teaching. In this embodiment, suggested search queries, e.g., trending queries or search suggestions are provided to the user for selection, and the corresponding content summary for each suggested search query has been generated before. At 802, multiple suggested search queries are presented to the user for selection. At 804, selection of one of the suggested search queries is received from the user. At 806, the top search results of the selected search query are fetched. At 808, one or more pre-generated content summaries with respect to the top search results are fetched from a database. At 810, the one or more content summaries are presented with the search results to the user.

Figure 9:
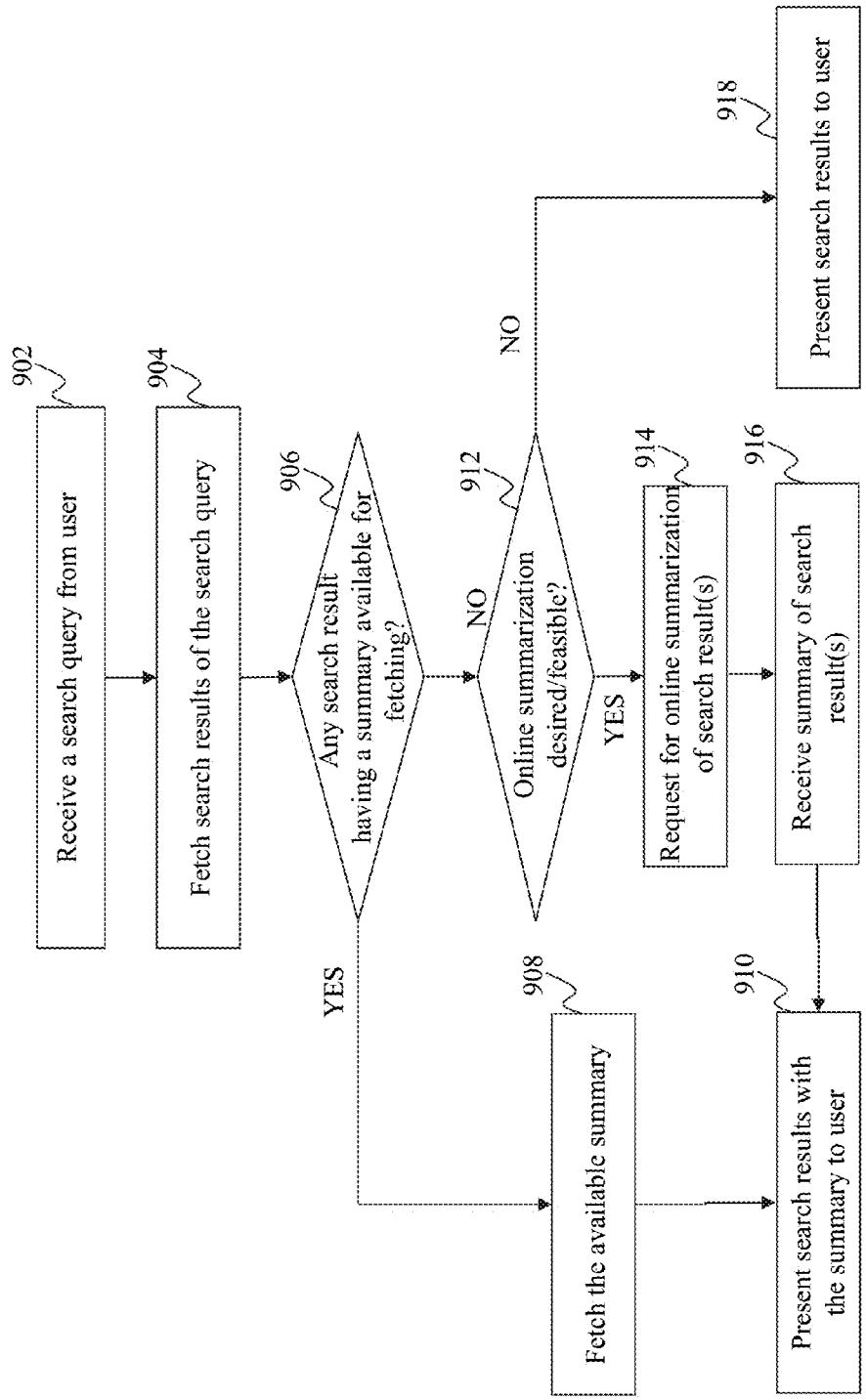
FIG. 9 is a flowchart of still another exemplary process for presenting a content summary of search results, according to an embodiment of the present teaching.

FIG. 9 is a flowchart of still another exemplary process for presenting a content summary of search results, according to an embodiment of the present teaching. In this embodiment, any keyword may be typed in by the user as a search query. Whether a content summary is available for any search result(s) of the search query is determined at runtime, and the search results page may vary in different situations. Starting at 902, a search query is received from a user. At 904, search result(s) of the search query are fetched. At 906, whether any of the fetched search results has a corresponding content summary available for fetching is determined. In other words, whether any of the search results has been summarized and stored before is determined. If the answer is "yes," at 908, the available content summary is fetched from the storage. If the answer is "no," at 912, whether online/real-time summarization is desirable and feasible is further determined. The decision may be made by the user and/or the system for the purpose of improving user experience. If online/real-time content summarization is desirable and feasible, at 914, a request is made to the content summarization engine 504 based on one or more of the search result(s). The content summary is received at 916. At 910, both the search result(s) and the content summary are presented to the user. Going back to 912, if online/real-time content summarization is not desirable or not feasible, then at 918, the search result(s) are presented to the user without any content summary.

Figure 10:
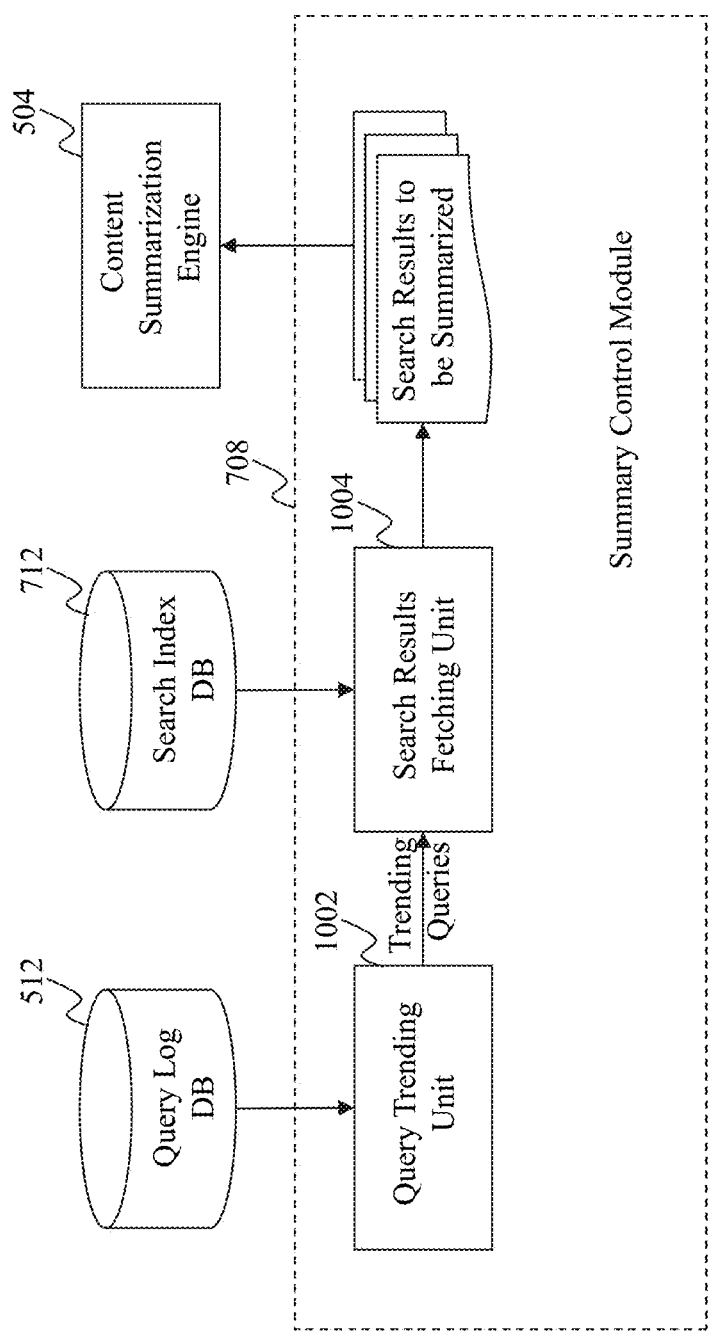
FIG. 10 is an exemplary system diagram of a summary control module in the search engine of FIG. 7, according to an embodiment of the present teaching.

FIG. 10 is an exemplary system diagram of a summary control module in the search engine of FIG. 7, according to an embodiment of the present teaching. The summary control module 708 in this embodiment can determine trending queries based on query popularity in the general user pool and request the content summarization engine 504 to perform offline content summarization for each of the trending queries. The summary control module 708 in this embodiment includes a query trending unit 1002 and a search results fetching unit 1004. The query trending unit 1002 may periodically check the query log database 512 to determine the top most popular search queries within a certain time period, i.e., trending queries. The trending queries list may be periodically updated by the query trending unit 1002, e.g., in every a few hours or daily, or dynamically updated when any search query suddenly becomes very popular. The search results fetching unit 1004 is responsible for fetching the top search results for each trending query and requesting the content summarization engine 504 to generate one or more content summaries for each trending query based on its search results. The one or more summaries are associated with the trending query and stored in the search results summary database 508 for future retrieval upon request.

Figure 11:
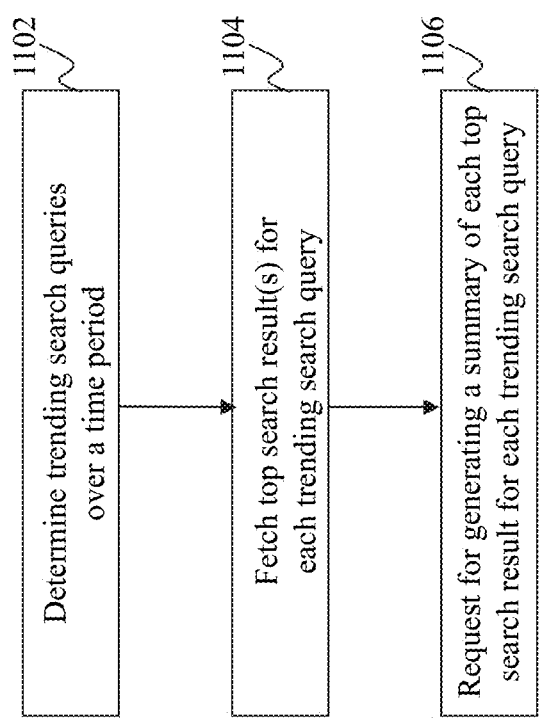
FIG. 11 is a flowchart of an exemplary process for generating offline content summaries for trending search queries, according to an embodiment of the present teaching.

FIG. 11 is a flowchart of an exemplary process for generating offline content summaries for trending search queries, according to an embodiment of the present teaching. Starting at 1102, trending search queries over a time period are determined. At 1104, the top search results for each of the trending search queries are fetched. At 1106, a request for generating a content summary of each top search result for each trending search query is sent to the content summarization engine 504. The method in this embodiment is suitable for generating a search results page as in the example of FIGS. 3-4 in which each top search result of a trending query has its own pre-generated content summary.

Figure 12:
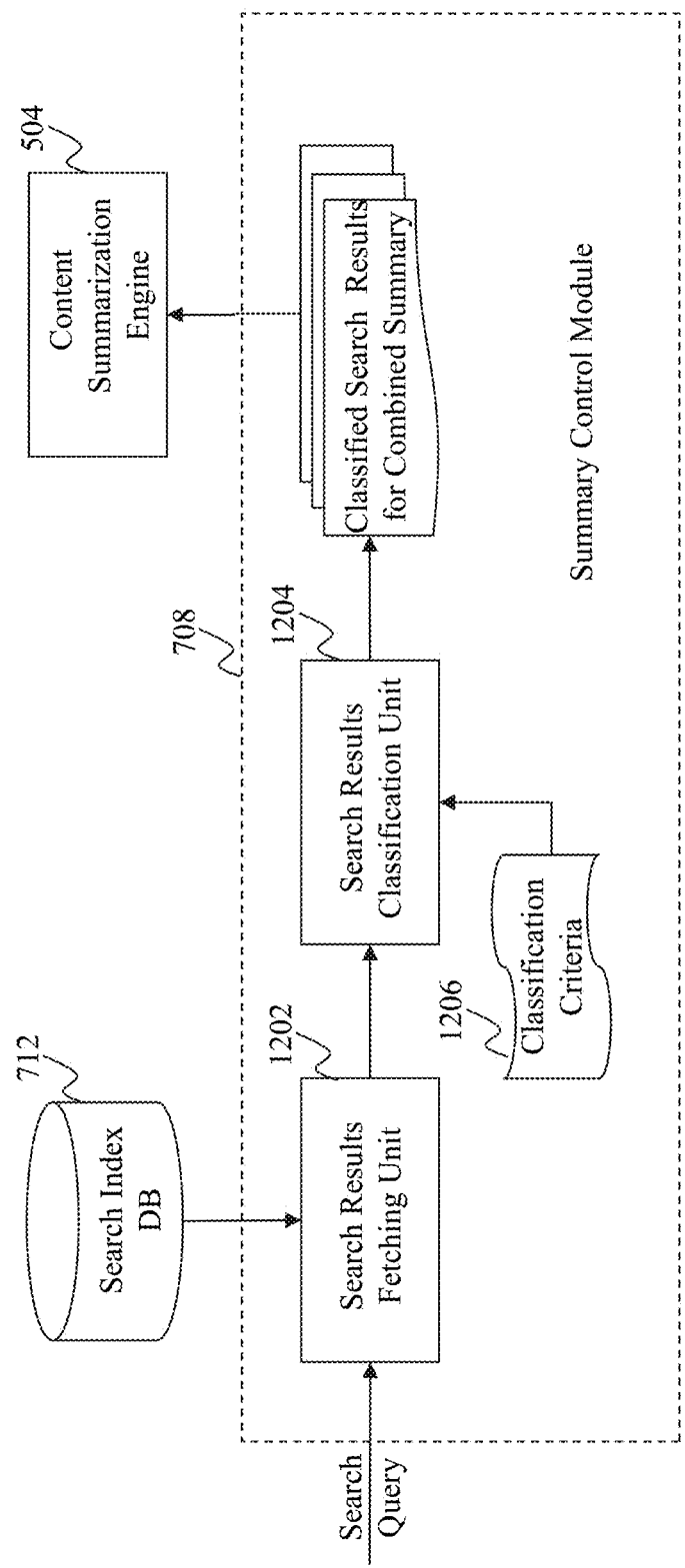
FIG. 12 is another exemplary system diagram of a summary control module in the search engine of FIG. 7, according to an embodiment of the present teaching.

FIG. 12 is another exemplary system diagram of a summary control module in the search engine of FIG. 7, according to an embodiment of the present teaching. The summary control module 708 in this embodiment can classify the search results of a particular search query based on various parameters related to online searching and can request the content summarization engine 504 to generate a combined content summary based on the classified multiple search results. The summary control module 708 in this embodiment includes a search results fetching unit 1202 and a search results classification unit 1204. The search results fetching unit 1202 fetches search results based on a search query from the search index database 712. Each of the search results may be associated with various search-related parameters, including but not limited to, the vertical from which the search result is retrieved, the topic of the search result, the relevance between the search result and the search query, and the content source of the search result. Based on one or more of those parameters, the search results classification unit 1204 classifies some or all of the fetched search results of the search query using predefined classification criteria 1206. For example, the classification criteria 1206 include classifying the top three most relevant (relevance) news articles (vertical) from a list of reputable news sources (content sources) as a "hot news" search results group. The classified multiple search results are included in a request sent by the search results classification unit 1204 to the content summarization engine 504 for generating a combined content summary of the classified search results. In the example above, a combined content summary is to be generated by the content summarization engine 504 based on the "hot news" search results group. It is understood that the combined content summary may be pre-generated offline or generated at runtime.

Figure 13:
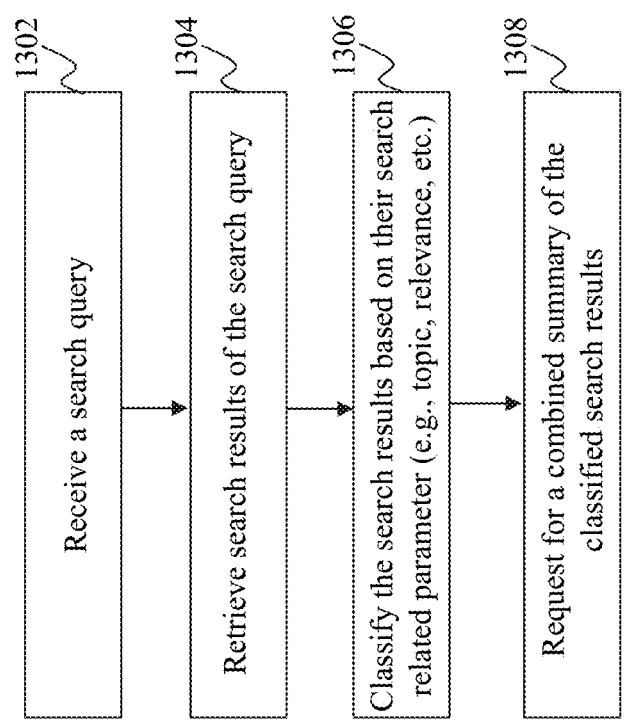
FIG. 13 is a flowchart of an exemplary process for generating a combined content summary for classified multiple search results, according to an embodiment of the present teaching.

FIG. 13 is a flowchart of an exemplary process for generating a combined content summary for classified multiple search results, according to an embodiment of the present teaching. Starting at 1302, a search query is received. At 1304, search results of the search query are retrieved. At 1306, at least some of the search results are classified based on one or more search-related parameters, e.g., vertical, topic, relevance, popularity, etc. At 1308, a request for a combined summary of the classified search results is sent to the content summarization engine 504. The method in this embodiment is suitable for generating a search results page as in the example of FIG. 2 in which a combined content summary is provided for the classified top search results of a trending search query.

Figure 14:
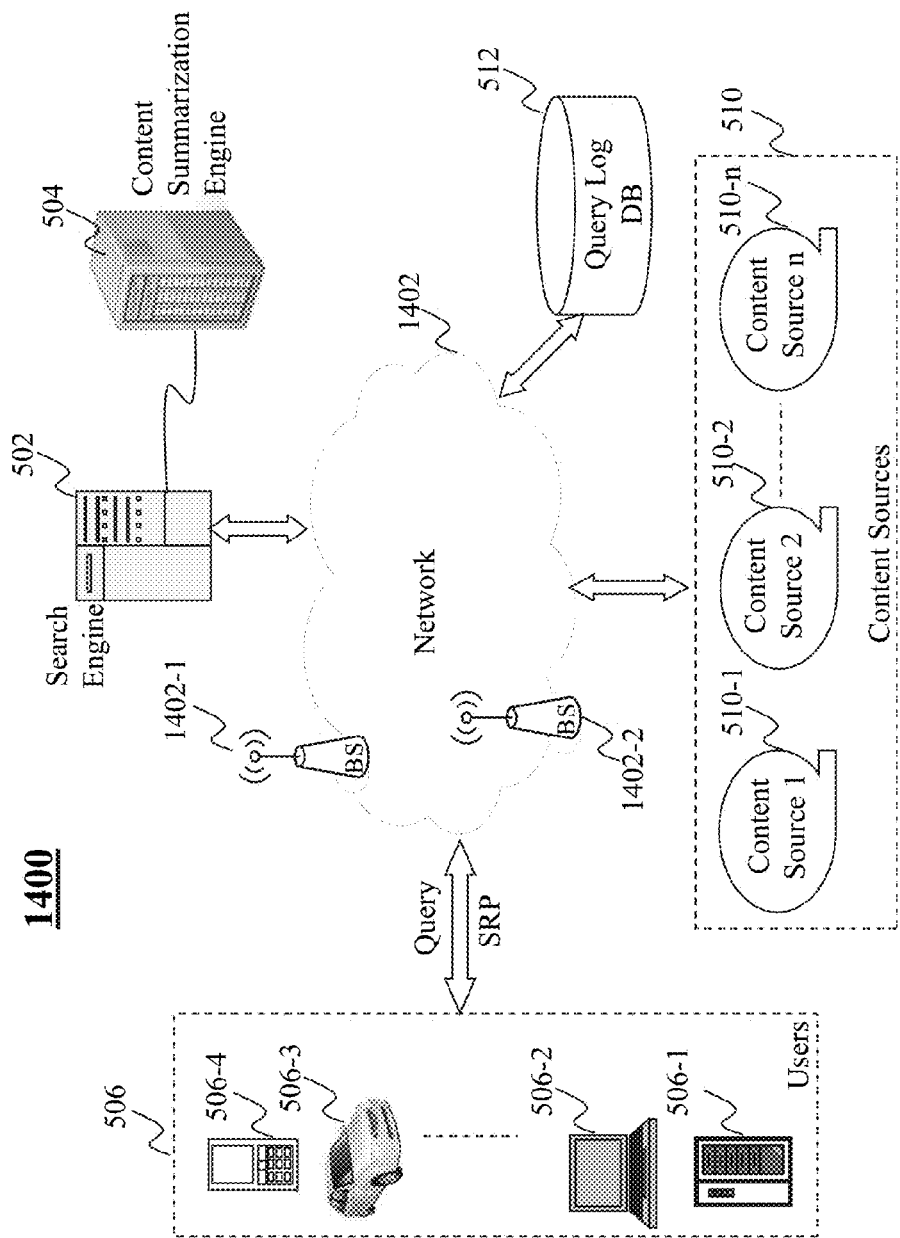
FIG. 14 is a high level exemplary networked environment in which search results content summary presentation is applied, according to an embodiment of the present teaching.

FIG. 14 depicts an exemplary embodiment of a networked environment in which search results content summary presentation is applied, according to an embodiment of the present teaching. In FIG. 14, the exemplary networked environment 1400 includes the search engine 502, the content summarization engine 504, the users 506, the content sources 510, the query log database 512, and a network 1402. The network 1402 may be a single network or a combination of different networks. For example, the network 1402 may be a local area network (LAN), a wide area network (WAN), a public network, a private network, a proprietary network, a Public Telephone Switched Network (PSTN), the Internet, a wireless network, a virtual network, or any combination thereof. The network 1402 may also include various network access points, e.g., wired or wireless access points such as base stations or Internet exchange points 1402-1, . . . , 1402-2, through which a data source may connect to the network 1402 in order to transmit information via the network 1402.

The users 506 may be of different types such as users connected to the network 1402 via desktop computers 506-1, laptop computers 506-2, a built-in device in a motor vehicle 506-3, or a mobile device 506-4. A user 506 may send a search query to the search engine 502 via the network 1402 and receive a search results page having search results and one or more content summaries therewith from the search engine 502. The content of at least one or some of the search results is summarized by the content summarization engine 504 offline or on the fly. In this embodiment, as described in detail above, the content summarization engine 504 serves as a backend system for providing content summaries of search results. In addition, in some embodiments, the search engine 502 may access query log, via the network 1402, stored in the query log database 512 to determine trending/popular queries or query suggestions to be provided to the users 506. The information in the query log database 512 may be generated by one or more different applications (not shown), which may be running on the search engine 502, at the backend of the search engine 502, or as a completely standalone system capable of connecting to the network 1402, accessing information from different sources, analyzing the information, generating structured information, and storing such generated information in the query log database 512.

The content sources 510 include multiple content sources 510-1, 510-2, . . . , 510-3, such as vertical content sources (e.g., shopping, local, news, finance, etc.). A content source may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine 502 and the content summarization engine 504 may retrieve information from any of the content sources 510-1, 510-2, . . . , 510-3. For example, the search engine 502 crawls the content sources 510-1, 510-2, . . . , 510-3 for building its search index database; the content summarization engine 504 fetches content to be summarized from the content sources 510-1, 510-2, . . . , 510-3.

Figure 15:
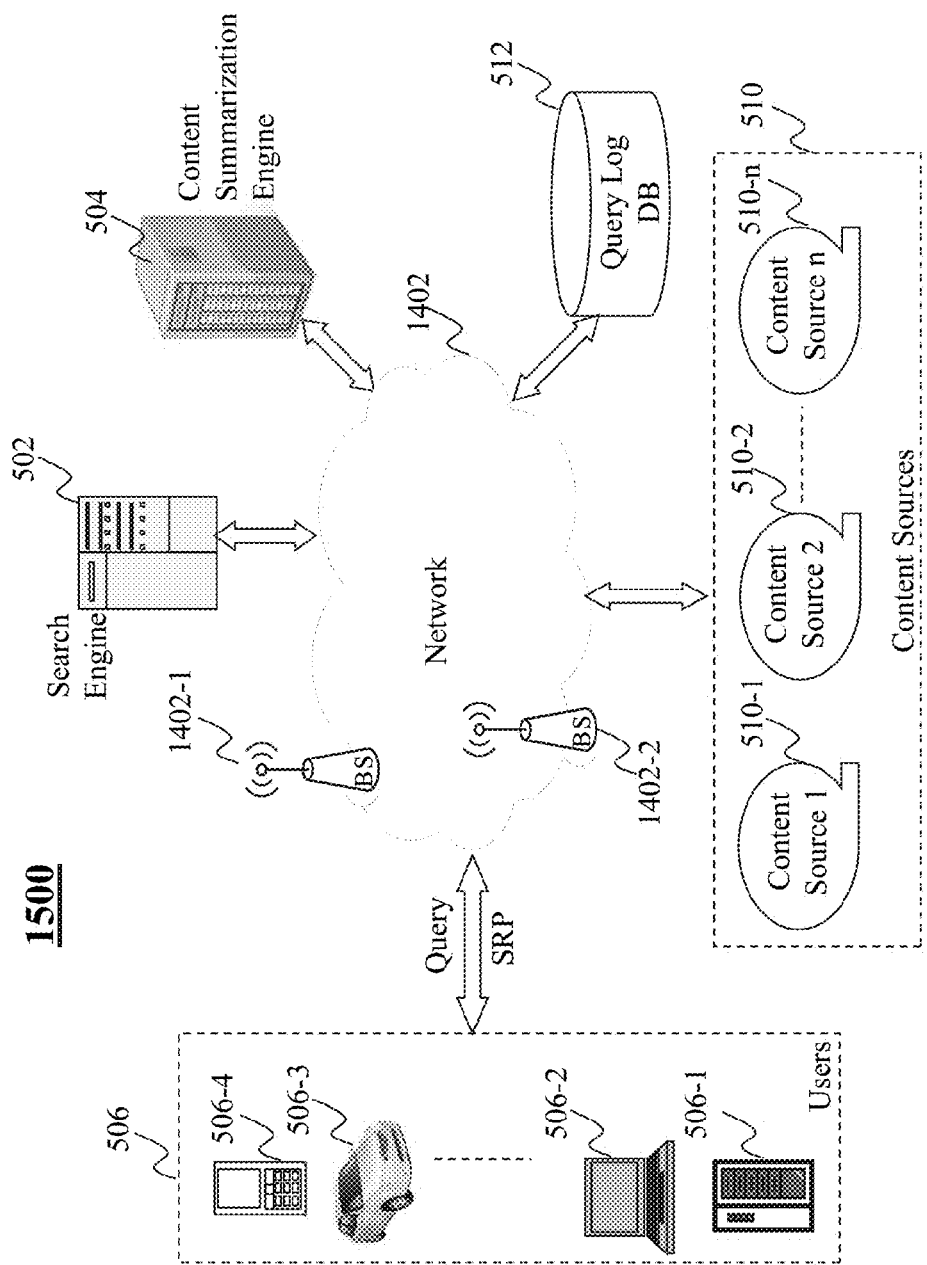
FIG. 15 is another high level exemplary networked environment in which search results content summary presentation is applied, according to an embodiment of the present teaching.

FIG. 15 is a high level depiction of another exemplary networked environment 1500 in which search results content summary presentation is applied, according to an embodiment of the present teaching. The networked environment 1500 in this embodiment is similar to the networked environment 1400 in FIG. 14, except that the content summarization engine 504 in this embodiment acts as an independent service provider that directly connects to the network 1402. For example, an independent service provider with the content summarization engine 504 may serve multiple search engines via the network 1402.

Figure 16:
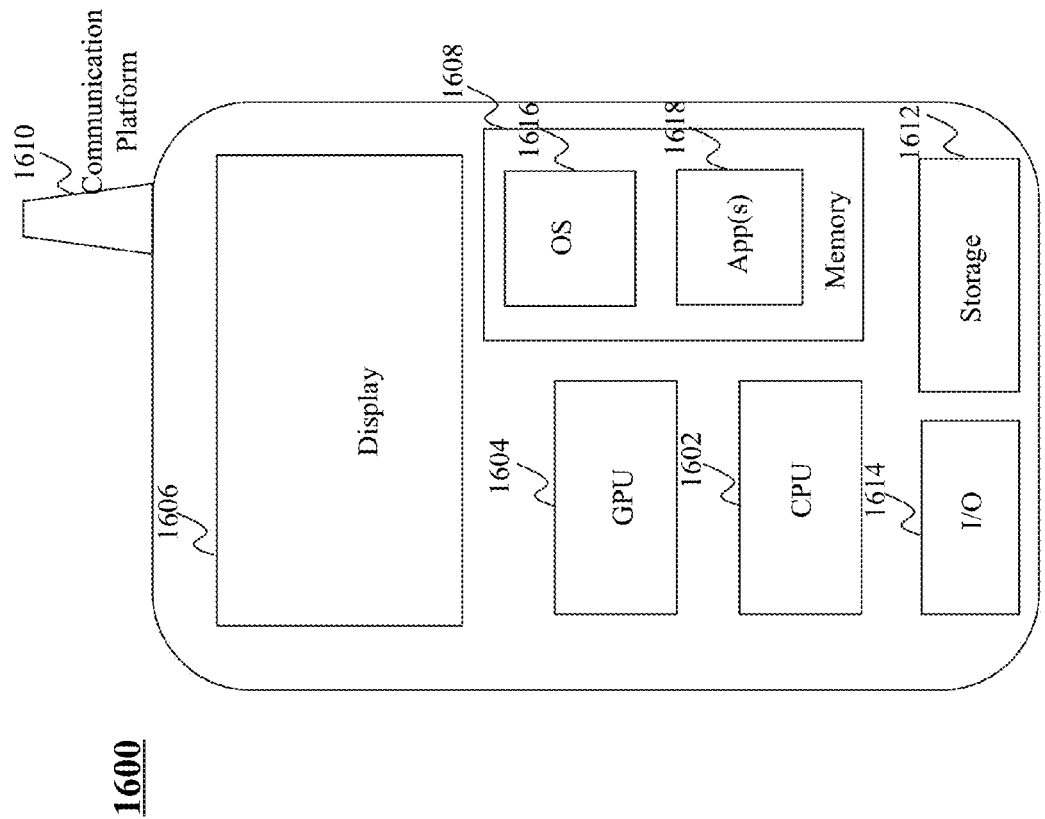
FIG. 16 depicts a general mobile device architecture on which the present teaching can be implemented.

FIG. 16 depicts a general mobile device architecture on which the present teaching can be implemented. In this example, the user device is a mobile device 1600, including but is not limited to, a smart phone, a tablet, a music player, a handled gaming console, a global positioning system (GPS) receiver, a smart-TV, wearable devices, etc. The mobile device 1600 in this example includes one or more central processing units (CPUs) 1602, one or more graphic processing units (GPUs) 1604, a display 1606, a memory 1608, a communication platform 1610, such as a wireless communication module, storage 1612, and one or more input/output (I/O) devices 1614. Any other suitable component, such as but not limited to a system bus or a controller (not shown), may also be included in the mobile device 1600. As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a browser or any other suitable mobile apps for sending the search query and rendering the search results page through the mobile device 1600. Execution of the applications 1618 may cause the mobile device 1600 to perform the processing as described above in the present teaching. For example, presentation of a search results page to the user may be made by the GPU 1604 in conjunction with the display 1606. A search query may be inputted by the user via the I/O devices 1614 and transmitted to the search engine 502 via the communication platform 1610.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 17:
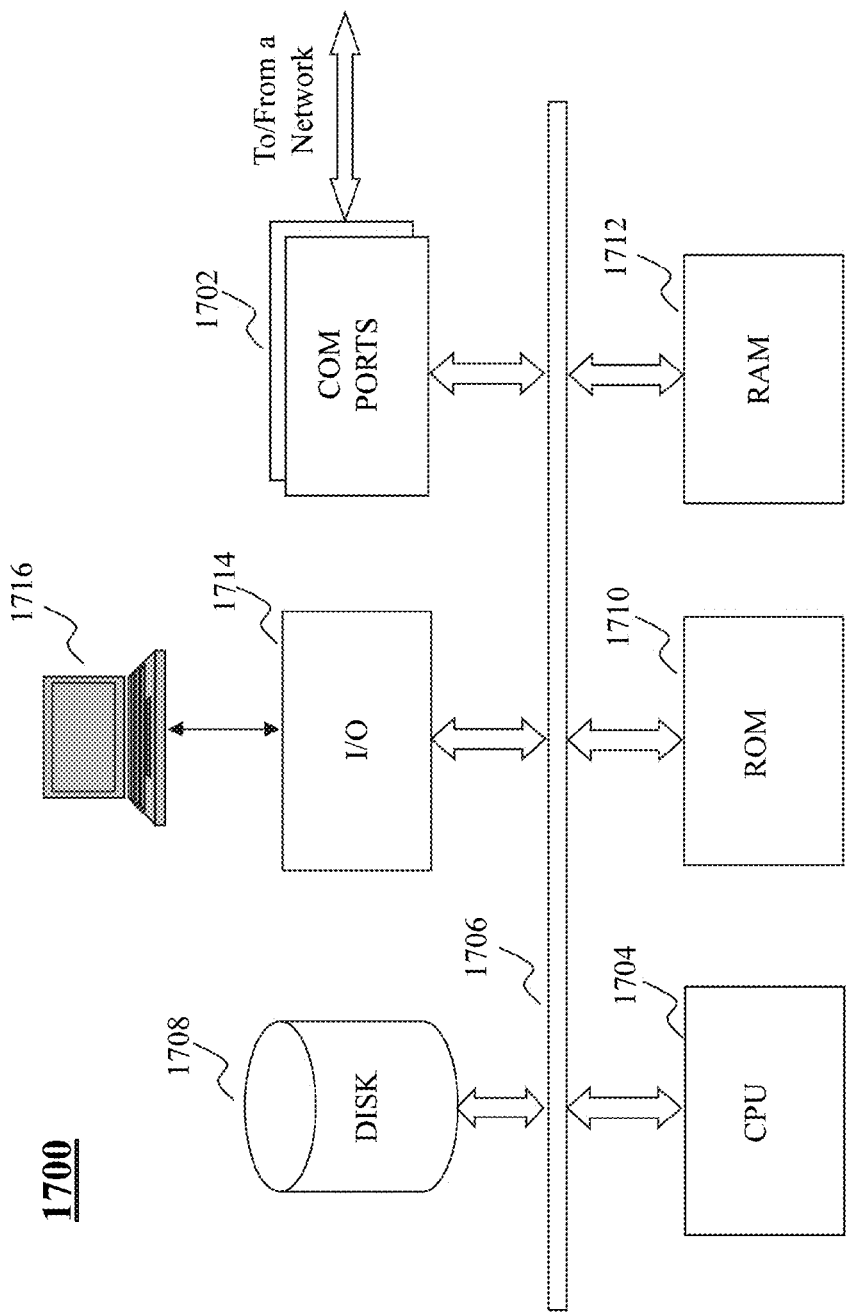
FIG. 17 depicts a general computer architecture on which the present teaching can be implemented.

FIG. 17 depicts a general computer architecture on which the present teaching can be implemented and has a functional block diagram illustration of a computer hardware platform that includes user interface elements. The computer may be a general-purpose computer or a special purpose computer. This computer 1700 can be used to implement any components of the online search architecture as described herein. Different components of the systems disclosed in the present teaching can all be implemented on one or more computers such as computer 1700, via its hardware, software program, firmware, or a combination thereof. Although only one such computer is shown, for convenience, the computer functions relating to online search may be implemented in a distributed fashion on a number of similar platforms, to distribute the processing load.

The computer 1700, for example, includes COM ports 1702 connected to and from a network connected thereto to facilitate data communications. The computer 1700 also includes a CPU 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU 1704. The computer 1700 also includes an I/O component 1714, supporting input/output flows between the computer and other components therein such as user interface elements 1716. The computer 1700 may also receive programming and data via network communications.

Hence, aspects of the methods of presenting content summary of search results, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for presenting content summary of search results, the method comprising:
receiving an input associated with a search query from a user, wherein the input includes selection of the search query from a plurality of search queries that are determined based on their popularities in a time period and presented to the user;
fetching one or more search results based on the search query;
determining whether a summary of content has been generated with respect to at least one of the one or more search results;
if the summary of content has been generated, retrieving the summary of content;
if the summary of content has not been generated, creating the summary of content; and
presenting a search result page to the user as a response to the input, wherein the search results page includes the one or more search results and at least part of the summary of content.

2. The method of claim 1, wherein
each of the plurality of search queries is associated with one or more search results; and
a summary of content with respect to at least some of the one or more search results has been generated for each of the plurality of search queries.

3. The method of claim 1, wherein
a plurality of summaries of content are obtained with respect to the one or more search results; and
the research results page includes the plurality of summaries of content.

4. The method of claim 1, wherein
each of the one or more search results is associated with a parameter; and
the summary of content is obtained with respect to at least some of the one or more search results that are determined based on their parameters.

5. The method of claim 4, wherein the parameter associated with a corresponding search result includes at least one of:
a vertical from which the corresponding search result is retrieved,
a topic of the corresponding search result,
relevance between the corresponding search result and the search query, and
content source of the corresponding search result.

6. The method of claim 1, wherein the at least part of the summary of content presented on the search result page is limited by a predetermined number of words.

7. The method of claim 6, wherein entirety of the summary of content is presented on the search result page in response to an input from the user.

8. A system having at least one processor storage, and a communication platform for presenting content summary of search results, the system comprising:
a user interfacing module configured to receive an input associated with a search query from a user, wherein the input includes selection of the search query from a plurality of search queries that are determined based on their popularities in a time period and presented to the user;
a search results fetching module configured to fetch one or more search results based on the search query;
a summary fetching module configured to determine whether a summary of content has been generated with respect to at least one of the one or more search results;
if the summary of content has been generated, retrieve the summary of content; and
if the summary of content has not been generated, create the summary of content with respect to at least one of the one or more search results; and
a search results page generating module configured to present a search result page to the user as a response to the input, wherein the search results page includes the one or more search results and at least part of the summary of content.

9. The system of claim 8, wherein
each of the plurality of search queries is associated with one or more search results; and
a summary of content with respect to at least some of the one or more search results has been generated for each of the plurality of search queries.

10. The system of claim 8, wherein
a plurality of summaries of content are obtained with respect to the one or more search results; and
the research results page includes the plurality of summaries of content.

11. The system of claim 8, wherein
each of the one or more search results is associated with a parameter; and
the summary of content is obtained with respect to at least some of the one or more search results that are determined based on their parameters.

12. The system of claim 11, wherein the parameter associated with a corresponding search result includes at least one of:
a vertical from which the corresponding search result is retrieved,
a topic of the corresponding search result,
relevance between the corresponding search result and the search query, and
content source of the corresponding search result.

13. The system of claim 8, wherein the at least part of the summary of content presented on the search result page is limited by a predetermined number of words.

14. The system of claim 13, wherein entirety of the summary of content is presented on the search result page in response to an input from the user.

15. A non-transitory machine-readable medium having information recorded thereon for presenting content summary of search results, wherein the information, when read by the machine, causes the machine to perform the following:
- receiving an input associated with a search query from a user, wherein the input includes selection of the search query from a plurality of search queries that are determined based on their popularities in a time period and presented to the user;
- fetching one or more search results based on the search query;
- determining whether a summary of content has been generated with respect to at least one of the one or more search results;
- if the summary of content has been generated, retrieving the summary of content;
- if the summary of content has not been generated, creating the summary of content; and
- presenting a search result page to the user as a response to the input, wherein the search results page includes the one or more search results and at least part of the summary of content.

* * * * *